United States Patent [19]

Anwyll, Jr.

[11] Patent Number: 5,554,246
[45] Date of Patent: Sep. 10, 1996

[54] AIR INFILTRATION BARRIER LAMINATE AND PROCESS FOR PREPARING SAME

[75] Inventor: James Anwyll, Jr., Ponte Veda Beach, Fla.

[73] Assignee: Anthony Industries, Inc., Adrian, Mich.

[21] Appl. No.: 371,835

[22] Filed: Jan. 12, 1995

[51] Int. Cl.⁶ ........................................... B32B 31/00
[52] U.S. Cl. ........................ 156/253; 428/252; 428/265
[58] Field of Search ......................... 156/253; 428/252, 428/265

[56] References Cited

U.S. PATENT DOCUMENTS

| | | | |
|---|---|---|---|
| 3,308,227 | 3/1967 | Power et al. | 264/284 |
| 3,799,827 | 3/1974 | Takimoto et al. | 156/219 |
| 3,959,546 | 5/1976 | Hill | 428/141 |
| 4,569,712 | 2/1986 | Shibano et al. | 156/244.14 |
| 4,987,014 | 1/1991 | Woodward et al. | 427/278 |
| 5,098,497 | 3/1992 | Brinley | 156/219 |
| 5,232,535 | 8/1993 | Brinley | 156/219 |

FOREIGN PATENT DOCUMENTS 516368  1/1940  United Kingdom.

*Primary Examiner*—Christopher Raimund
*Attorney, Agent, or Firm*—Donald R. Fraser

[57] ABSTRACT

An air infiltration barrier laminate comprises a perforated laminate made from a woven polyolefin fabric, a resin, and a polyolefin film.

9 Claims, 1 Drawing Sheet

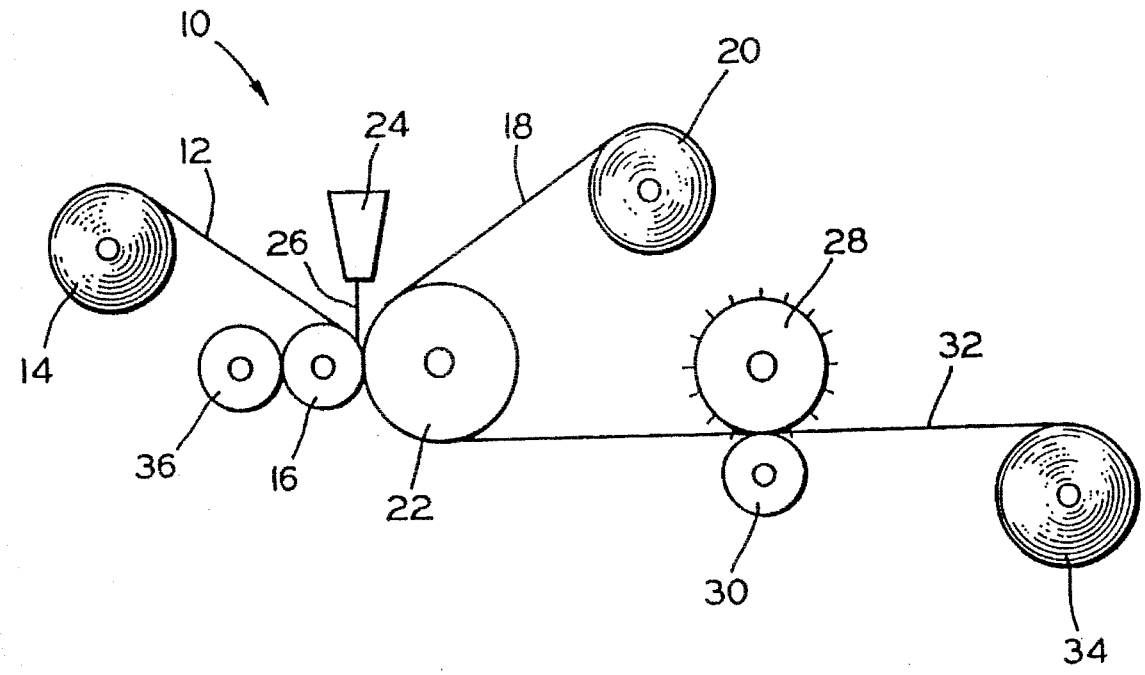

AIR INFILTRATION BARRIER LAMINATE AND PROCESS FOR PREPARING SAME

FIELD OF THE INVENTION

This invention relates generally to an air infiltration barrier laminate and a process for preparing same. More particularly, the invention is directed to a perforated laminate constructed from a woven polyolefin fabric, a resin, and a polyolefin film, and to a process for laminating and perforating the layered construction to prepare an air infiltration barrier for use as a wrap material for residential and commercial buildings.

BACKGROUND OF THE INVENTION

Polymeric and paper sheet materials are known to be useful as air infiltration barriers for constructing buildings. These materials are generally placed over the perimeter walls of a building prior to the application thereover of a decorative finish layer, e.g., brick or cedar clapboard siding. Such "house wrap" products substantially prevent the passage therethrough of air, while allowing the passage of water vapor. Where the house wrap is not water vapor permeable, such as for example when a polymeric film is used, it is generally perforated to allow the passage therethrough of water vapor.

Many such house wraps have poor dimensional stability, and tend to sag over time causing tears, thus allowing air infiltration. To avoid such sagging, reinforcement filaments are sometimes incorporated into the house wrap products. However, many of these commercially available products containing reinforcement filaments tend to fail due to separation of the woven structures from the matrix.

It would be desirable to prepare a house wrap laminate containing a woven reinforcement which is securely bonded to the product matrix.

SUMMARY OF THE INVENTION

Accordant with the present invention, there has surprisingly been discovered a process for preparing a laminate which is useful as an air infiltration barrier for commercial and residential structures. The process comprises:

providing a woven polyolefin fabric;

providing a polyolefin film;

extrusion coating a layer of molten resin onto the woven polyolefin fabric;

contacting the polyolefin film to the layer of resin, and laminating together the woven polyolefin fabric, the resin, and the polyolefin film; and perforating the laminated structure.

The invention further includes the laminate prepared by the inventive process. The laminate comprises:

a woven polyolefin fabric;

a layer of resin adhered to the woven polyolefin fabric; and a polyolefin film adhered to the layer of resin; said laminate including a multiplicity of perforations therethrough.

The air infiltration barrier laminate prepared according to the present invention is particularly useful as a house wrap.

BRIEF DESCRIPTION OF THE DRAWINGS

FIG. 1 is a schematic representation of the process of the present invention, illustrating the extrusion coating, laminating, and perforating operations.

DETAILED DESCRIPTION OF THE PREFERRED EMBODIMENTS

Referring now to FIG. 1, there is shown generally at 10 a schematic representation of a process for preparing an air infiltration barrier laminate according to the present invention. A web of woven polyolefin fabric 12 advances from a polyolefin fabric supply role 14 onto a nip roll 16. Simultaneously, a polyolefin film 18 advances from a polyolefin film supply roll 20 onto a chill roll 22. A resin is melted in a conventional extruder (now shown), extended through a die 24 in the form of a sheet of molten resin 26, and deposited onto the web of woven polyolefin fabric 12. The woven polyolefin fabric 12, having the layer of molten resin 26 thereon, and the polyolefin film 18, are pressed together between the nip roll 16 and the chill roll 22, thereby laminating the assemblage. The resultant laminated material is parted from the chill roll 22 and passed through a needle punch comprising a punch 28 and a backup wheel 30. Thereafter, the resultant air infiltration barrier laminate 32 is accumulated onto a take-up roll 34.

The woven polyolefin fabric suitable for use according to the present invention comprises a polyolefin film including reinforcing filaments. Examples of useful polyolefin materials for preparing the woven polyolefin fabric include, but are not necessarily limited to, high, medium, and low density polyethylene, polypropylene, polybutylene, and the like, as well as blends and copolymers thereof. A preferred polyolefin is high density polyethylene. The reinforcing filaments may comprise conventional materials such as, for example, glass or metal fibers, or polymeric fibers made from polyesters, acrylics, polycarbonates, and the like. The reinforcement filaments are present in the woven polyolefin fabric in a concentration from about a 4.5×2.5 to about a 24×12 tape count per inch and have a Denier ranging from about 200 to about 2500. A preferred woven polyolefin fabric may be obtained from Fabrene, Inc. of North Bay, Ontario, Canada under the product designation "FABRENE ATA".

Suitable polyolefin films for practicing the present invention include, but are not necessarily limited to, those prepared from high, medium, or low density polyethylene, polypropylene, polybutylene, and the like, as well as blends and copolymers thereof. A preferred polyolefin film is linear low density polyethylene having a thickness ranging from about 0.25 mil to about 400 mils. A preferred linear low density polyethylene film may be obtained from National Poly of Atlanta, Ga.

The resin suitable for extrusion coating onto the woven polyolefin fabric according to the present invention may be selected, by way of example but not limitation, from high, medium or low density polyethylene, polypropylene, polyester, polyurethane, acrylic, polyamide, polyvinyl acetate, polyvinyl chloride, styrenic, polycarbonate, and the like, as well as blends and copolymers thereof. A preferred resin comprises low density polyethylene. A preferred low density polyethylene may be obtained from Eastman Chemical of Kingsport, Tenn. under the product designation "EASTMAN 808P". Preferably, the resin is extruded so as to form a layer of resin on the woven polyolefin fabric, said layer having a thickness from about 0–1 mil to about 400 mils.

The nip roll 16 is typically a rubber or rubber covered roll, having a Durometer hardness from about 50 to about 75. A pressure back-up roll may be utilized to urge the nip roll 16 toward the chill roll 22. The pressure between the nip roll 16 and the chill roll 22 generally ranges from about 10 pounds per linear inch to about 200 pounds per linear inch. Preferably, the pressure is from about 50 to about 150 pounds per linear inch. A most preferred process utilizes a rubber nip roll 16, having a Durometer hardness of about 60, which contacts the chill roll 22 at a pressure there between of from about 80 to about 100 pounds per linear inch.

The chill roll 22 may have a smooth surface, or may have a patterned surface prepared by etching with an appropriate acid solution as is well-known in the engraving industry. Generally, the chill roll 22 is chrome plated to prevent deterioration of its surface. The chill roll 22 may be cooled by any conventional technique, such as for example by passing a cooling medium, e.g., water, through the interior thereof. The temperature of the chill roll 22 is conveniently maintained from about 55° F. to about 150° F. during the lamination operation.

The resin may be melted in any conventional extrusion apparatus generally known in the art, and discharged from the die 24 to form the falling sheet of molten resin 26. The resin is extruded at such a rate so as to form a layer of molten resin as the woven polyolefin fabric 12, said layer having a thickness from about 0.1 mil to about 400 mils. Preferably, the thickness is about 1 mil. At the extrusion die 24, the resin temperature is generally maintained at from about 400° F. to about 700° F., depending upon the type of resin used and the thickness of the sheet of molten resin 26 desired. Preferably, the extrusion temperature is from about 580° F. to about 625° F.

In operation, the woven polyolefin fabric 12 and polyolefin film 18 are advanced at the same rate, between about 50 feet per minute and about 500 feet per minute, into the nip assembly. Immediately prior to entering the nip, the resin is extrusion coated onto the woven polyolefin fabric 12. Also contemplated as equivalent in operability and utility is a slightly modified process (not shown) wherein the molten resin is extruded directly into the nip where the woven polyolefin fabric 12 and polyolefin film 18 are laminated.

As the woven polyolefin fabric 12 having the layer of resin thereon and the polyolefin film 18 enter the nip, the various layers are pressed together and laminated. The molten resin layer solidifies and bonds the woven polyolefin fabric 12, resin, and polyolefin film 18 into a monolithic laminate. The resultant structure exhibits superior resistance to separation of the reinforcing filament strands from the laminate matrix. The polyolefin film 18 effectively stabilizes the woven polyolefin fabric 12, thereby eliminating product failure.

As the laminated structure exits the nip, the resin solidifies by the transfer of heat energy to the chill roll 22. At a subsequent position on the circumference of the chill roll 22, the laminate is parted therefrom and passed to a conventional device for perforating the laminate, such as a needle punch. Conveniently, the laminate may be perforated by passing the laminate between a rotating punch 28 and corresponding backup wheel 30, which effectively places a multiplicity of apertures in the laminate. Such apertures may range in size from about 0.2 mil to about one-quarter inch. As will readily be apparent to those ordinarily skilled in the art of manufacturing air infiltration barriers, the shapes, numbers, and placement of the apertures may vary over wide limits.

EXAMPLE

A high density polyethylene woven fabric having 4.5×2.5 tape count per inch reinforcing filaments (FABRENE ATA), and a linear low density polyethylene film having a thickness of about 1.25 mils, are simultaneously fed into the nip formed between a rubber nip roll having a Durometer hardness of about 60 and a chill roll. Low density polyethylene (EASTMAN 808P) molten resin is extrusion coated at a temperature of about 620° F. onto the woven polyethylene fabric substantially at the nip, at a rate so as to form a layer about 1 mil thick. The materials are laminated together at a pressure of about 80 pounds per linear inch. The resultant laminated structure is parted from the chill roll and perforated by passing same through a needle punch where apertures approximately 0.2 mils in diameter are cut therein. The resulting air infiltration barrier laminate is thereafter wound onto a take-up roll. The air infiltration barrier laminate thus produced is then used as an effective house wrap for a residential building.

This Example may be repeated with similar success by substituting the generically or specifically described materials and/or conditions recited herein for those set forth in the preceding Example.

From the foregoing description, one ordinarily skilled in the art can easily ascertain the essential characteristics of this invention and, without departing from its spirit or scope, can make various changes and modifications to adapt the invention to various uses and conditions.

What is claimed is:

1. A process for preparing an air infiltration barrier laminate, comprising:

providing a woven polyolefin fabric;

providing a polyolefin film;

extrusion coating a layer of molten resin onto the woven polyolefin fabric;

contacting the polyolefin film to the layer of resin, and laminating together the woven polyolefin fabric, the resin, and the polyolefin film; and perforating the laminated structure.

2. The process according to claim 1, wherein the woven polyolefin fabric comprises high density polyethylene reinforcing filaments having a concentration of about 4.5×2.5 tape count per inch.

3. The process according to claim 1, wherein the resin is low density polyethylene.

4. The process according to claim 1, wherein the polyolefin film is linear low density polyethylene.

5. The process according to claim 1, wherein the resin is extruded to form a layer having a thickness from about 0.1 to about 400 mils.

6. The process according to claim 1, wherein the resin is extruded at a temperature from about 500 degrees F. to about 700 degrees F.

7. The process according to claim 1, wherein the contacting occurs at a pressure from about 10 to about 200 pounds per linear inch.

8. The process according to claim 1, wherein the apertures placed in the laminate during the perforating step have sizes from about 0.2 mil to about one-quarter inch.

9. The process according to claim 1, wherein the woven polyolefin fabric and polyolefin film are provided at a rate of from about 50 to about 500 feet per minute.

* * * * *